US007873671B2

(12) United States Patent
Barsness et al.

(10) Patent No.: US 7,873,671 B2
(45) Date of Patent: *Jan. 18, 2011

(54) DATABASE RELATIONSHIP CONSTRAINT

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1756 days.

This patent is subject to a terminal disclaimer.

(21) Appl. No.: 10/793,526

(22) Filed: Mar. 4, 2004

(65) Prior Publication Data
US 2005/0198048 A1    Sep. 8, 2005

(51) Int. Cl.
*G06F 7/00* (2006.01)
(52) U.S. Cl. .................. 707/802; 707/803; 707/804
(58) Field of Classification Search .............. 707/1, 707/2, 3, 7, 100, 101, 103 R, 203, 12, 802–804
See application file for complete search history.

(56) References Cited

U.S. PATENT DOCUMENTS

| 5,680,614 | A | 10/1997 | Bakuya et al. | |
|---|---|---|---|---|
| 6,351,742 | B1 * | 2/2002 | Agarwal et al. | 707/3 |
| 6,463,429 | B1 * | 10/2002 | Geppert et al. | 707/3 |
| 7,171,408 | B2 | 1/2007 | Zuzarte | |
| 7,272,591 | B1 * | 9/2007 | Ghazal et al. | 707/2 |
| 2003/0078923 | A1 * | 4/2003 | Voss et al. | 707/7 |
| 2005/0131913 | A1 * | 6/2005 | Barsness et al. | 707/100 |

OTHER PUBLICATIONS

Oracle, Data Integrity, 1996, pp. 1-16.*
Carole Goble, Integrity Constraints in Oracle 8i, Feb. 23, 2001, pp. 1-7.*
Advance Table Techniques, pp. 1-11.*
"Constraints and Triggers", pp. 1-3, http://www.cs.toronto.edu/db/courses/db2/constraints.html.
US patent application filed Dec. 11, 2003, U.S. Appl. No. 10/733,752; "Database Range Constraint that is Dynamically Limited by Data in the Database".

* cited by examiner

*Primary Examiner*—Apu M. Mofiz
*Assistant Examiner*—Cindy Nguyen
(74) *Attorney, Agent, or Firm*—Martin & Associates, LLC; Derek P. Martin

(57) ABSTRACT

According to the preferred embodiments, a database relationship constraint is defined for a first column that specifies a set of allowable values for the first column that depend on a set of data values in a second column that may be of a different type than data in the first column. In a first embodiment, a database relationship constraint specifies allowable values for one column in a database table based on one or more data values in a different column in the same database table. In a second embodiment, a database relationship constraint specifies a set of allowable values in a first column based on one or more data values in a second column in a different database table. In both cases, the data in the second column may be of a different type than data in the second column.

51 Claims, 7 Drawing Sheets

Table T

| | C1 | C2 | C3 | C4 | C5 | C6 | C7 | C8 | C9 |
|---|---|---|---|---|---|---|---|---|---|
| | Last Name | First Name | MI | Address | City | State | ZIP | Age | Marital Status |
| 1 | Jones | Mary | A | 211 Elm | Cody | WY | 82414 | 26 | M |
| 2 | Smith | Bill | M | 614 Ash | Bylas | AZ | 85530 | 12 | S |
| ... | ... | ... | ... | ... | ... | ... | ... | ... | ... |
| N-1 | Bell | Cory | D | 541 Ivy | Ukiah | CA | 95482 | 67 | D |
| N | Davis | Amy | C | 916 Ore | Albin | WY | 82050 | 43 | W |

State = Valid 2-digit US state code

FIG. 4  Prior Art

Marital Status = S or M or D or W

FIG. 5  Prior Art

If Age<15, Marital Status=S

Case    State=AZ, ZIP=85* OR 86*
        State=CA, ZIP=91*<ZIP<96*
              •
              •
              •
        State=WY, ZIP=82***
End Case

FIG. 9

Case    T.C7=AZ, T.C8=85* OR 86*
        T.C7=CA, 91*<T.C8<96*
              •
              •
              •
        T.C7=WY, T.C8=82***
End Case

FIG. 10

Table X

| | C1 | C2 | C3 | C4 | C5 | C6 | C7 | C8 |
|---|---|---|---|---|---|---|---|---|
| | Last Name | First Name | MI | Address | City | State | ZIP | Age |
| 1 | Jones | Mary | A | 211 Elm | Cody | WY | 82414 | 26 |
| 2 | Smith | Bill | M | 614 Ash | Bylas | AZ | 85530 | 12 |
| N-1 | Bell | Cory | D | 541 Ivy | Ukiah | CA | 95482 | 67 |
| N | Davis | Amy | C | 916 Ore | Albin | WY | 82050 | 43 |

FIG. 12

Table Y

| | C1 | C2 | C3 | C4 | C6 |
|---|---|---|---|---|---|
| | Last Name | First Name | MI | Sex | Marital Status |
| 1 | Jones | Mary | A | F | M |
| 2 | Smith | Bill | M | M | S |
| N-1 | Bell | Cory | D | M | D |
| N | Davis | Amy | C | F | W |

FIG. 13

If Age<15, Marital Status=S

DATABASE RELATIONSHIP CONSTRAINT

RELATED APPLICATION

This patent application is related to U.S. patent application entitled "DATABASE RANGE CONSTRAINT THAT IS DYNAMICALLY LIMITED BY DATA IN THE DATABASE", Ser. No. 10/733,752, filed on Dec. 11, 2003, which is incorporated herein by reference.

BACKGROUND OF THE INVENTION

1. Technical Field

This invention generally relates to computer systems, and more specifically relates to database constraints.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Database constraints are known in the art, and are used to limit data that may be entered into a database column. For example, a range constraint for a column that includes the age of people may have a range constraint that limits the entries to integer values from 1 to 99. If someone tries to enter a negative number, or zero, or 110, the database manager will detect that the data specified for the age column does not satisfy the limits specified in the range constraint for the age column, and will reject the attempt to enter data that is not within the specified range. In this manner, data may be limited to expected ranges.

Another known database constraint is a foreign key constraint, which limits allowable values for a column to data entered into the same column in a different table. This concept is powerful and useful when tables are related. Thus, a foreign key constraint may be specified that will not allow entry of a record into a table unless a corresponding record in a different table exists. The foreign key constraints are limited, however, in constraining a column based on allowable values in a different column that is of the same data type. A foreign key constraint assures the same data is entered into two columns of different database tables. As a result, the foreign key constraints are necessarily limited to specifying allowable values for a column based on a column of the same data type.

Table check constraints are also known in DB2 that allow specifying conditions across multiple columns for a record to be entered into the table. For example, a table check constraint could be defined for the table that assures that every employee who was hired prior to 1986 must make more than $40,000 per year. For example, such a table check constraint would only allow entry of data into the table if data in a HIREDATE column is less than 1986 and data in a SALARY column is less than $40,000. While table check constraints are useful, they are constraints on a table, not on a specific column within the table.

Known database constraints do not allow specifying allowable values for one column based on data in a second column when the second column has a different data type than the first column. Without a way for specifying allowable values in one column based on data in a second column that may be of a different type than data in the first column, the computer industry will continue to suffer from constraints that do not provide the desired flexibility.

DISCLOSURE OF INVENTION

According to the preferred embodiments, a database relationship constraint is defined for a first column that specifies a set of allowable values for the first column that depend on a set of data values in a different column that may be of a different type than data in the first column. In a first embodiment, a database relationship constraint specifies allowable values for one column in a database table based on one or more data values in a different column in the same database table. In a second embodiment, a database relationship constraint specifies a set of allowable values in a first column based on one or more data values in a second column in a different database table. In both cases, the data in the second column may be of a different type than data in the second column, and the set of allowable values for the relationship constraint may additionally depend on data in a third database column. In this manner a relationship constraint for a column may limit the set of allowable values according to one or more data values in one or more other columns that are not necessarily of the same data type.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 shows a sample database table for illustrating the concepts of the prior art and the first embodiment;

FIG. 3 shows a sample prior art range constraint for column C8 in the table of FIG. 2;

FIG. 4 shows a sample prior art constraint for column C6 in the table of FIG. 2;

FIG. 5 shows a sample prior art constraint for column C9 in the table of FIG. 2;

FIG. 7 shows a first relationship constraint in accordance with the first embodiment that defines allowable values for a MARTIAL STATUS column based on data values in the AGE column of the same table;

FIG. 8 is another representation of the relationship constraint of FIG. 7 that uses column identifiers instead of column names;

FIG. 9 shows a relationship constraint in accordance with the first embodiment that defines allowable values for the ZIP column based on data values in the STATE column;

FIG. 10 is another representation of the relationship constraint of FIG. 9 that uses column identifiers instead of column names;

FIG. 12 is a first sample database table for illustrating the concepts of the second embodiment;

FIG. 13 is a second sample database table for illustrating the concepts of the second embodiment;

FIG. 14 shows a relationship constraint in accordance with the second embodiment that defines allowable values for the AGE column in Table X in FIG. 12 based on data values in the MARITAL STATUS column of Table Y in FIG. 13; and FIG. 15 is another representation of the relationship constraint of FIG. 9 that uses column identifiers instead of column names.

BEST MODE FOR CARRYING OUT THE INVENTION

The preferred embodiments define a relationship constraint that specifies one or more allowable values for a database column based on one or more data values in a different database column. In a first embodiment, a relationship constraint for a database column has a set of allowable values defined by data in a different column of the same table. In a second embodiment, a relationship constraint for a database column has a set of allowable values defined by data in a column in a different database table. Examples in accordance with the preferred embodiments are presented below.

Figure 1:
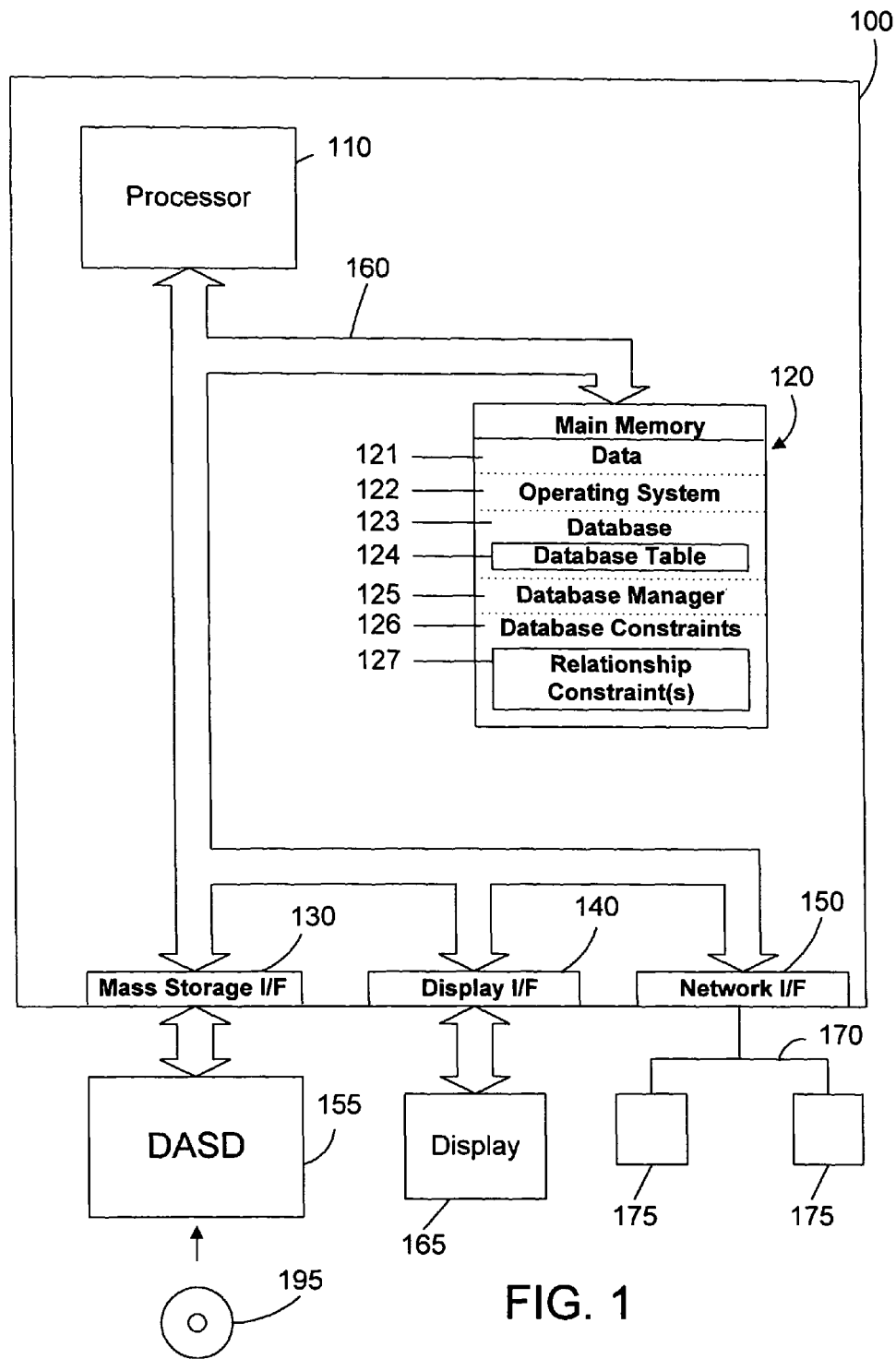
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a database manager 125, and database constraints 126. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes one or more database tables 124. Each database table 124 preferably includes data organized in columns and rows, with each row in the database table 124 defining an entry (or record) in the corresponding database table 124. Database manager 125 provides an interface to database 123 that allows reading data from and writing data to the database table(s) 124. Database constraints 126 include known database constraints, such as primary key constraints, unique constraints, foreign key constraints, and check constraints, which include range constraints. Note, however, that database constraints 126 additionally include one or more relationship constraints 127 in accordance with the preferred embodiments. A relationship constraint 127 specifies a set of allowable values for a first column that depends on data in a second column that may be of a different type than data in the first column. In a first embodiment, the different column is in the same database table. In a second embodiment, the different column is in a different database table. By providing a relationship constraint on a column that specifies a set of allowable values for a column that are a function of data in a different column, the relationship constraints 127 are data-driven from data in the database. Note that the term "set" when used in the phrase "set of allowable values" herein is used in a mathematical sense, and may include no values (empty set), one value (e.g., 20), multiple values (e.g., 20, 30), or an infinite number of values (e.g., real number between 20.0 and 30.0).

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database manager 125, and database constraints 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Referring to FIG. 2, a sample database table T is used to illustrate the concepts of the prior art and of the first embodiment of the present invention. Table T includes nine columns C1-C9, and N rows, as shown. We assume for this simple example that column C1 contains a last name, column C2 contains a first name, column C3 contains a middle initial, column C4 contains an address, column C5 contains a city, column C6 contains a two letter state code, column C7 contains a five digit ZIP code, column C8 contains an age number, and column C9 contains a single letter marital status code.

With table T as shown in FIG. 2, a prior art range constraint could be defined as shown in FIG. 3 that specifies a range for values in the AGE column C8 between 1 and 99. This range constraint will prevent data outside of the range from 1-99 from being entered into the AGE column C8 in table T. The database manager that handles insertion of data into table T will enforce the range constraint to keep the data in the column within the specified range. This simple range constraint prevents a database entry person from entering a negative number, zero, or a number larger than 99 into the AGE column.

Another prior art check constraint is shown in FIG. 4, which specifies that the STATE column must contain a value two digit US state code, as is know in the art in the United States and as defined by the United States Postal Service. The logic for the constraint is shown in FIG. 4 without showing the detailed implementation. This constraint could be implemented by providing a list of valid state codes and checking the data to be entered into the STATE column against the list of valid state codes, and only allowing data to be entered into the STATE column when the data is in the list of valid state codes. Another prior art check constraint is shown in FIG. 5, where the Marital Status column is specified to have only four possible single letter entries, namely S (single), M (married), D (divorced) or W (widowed or widower).

Figure 6:
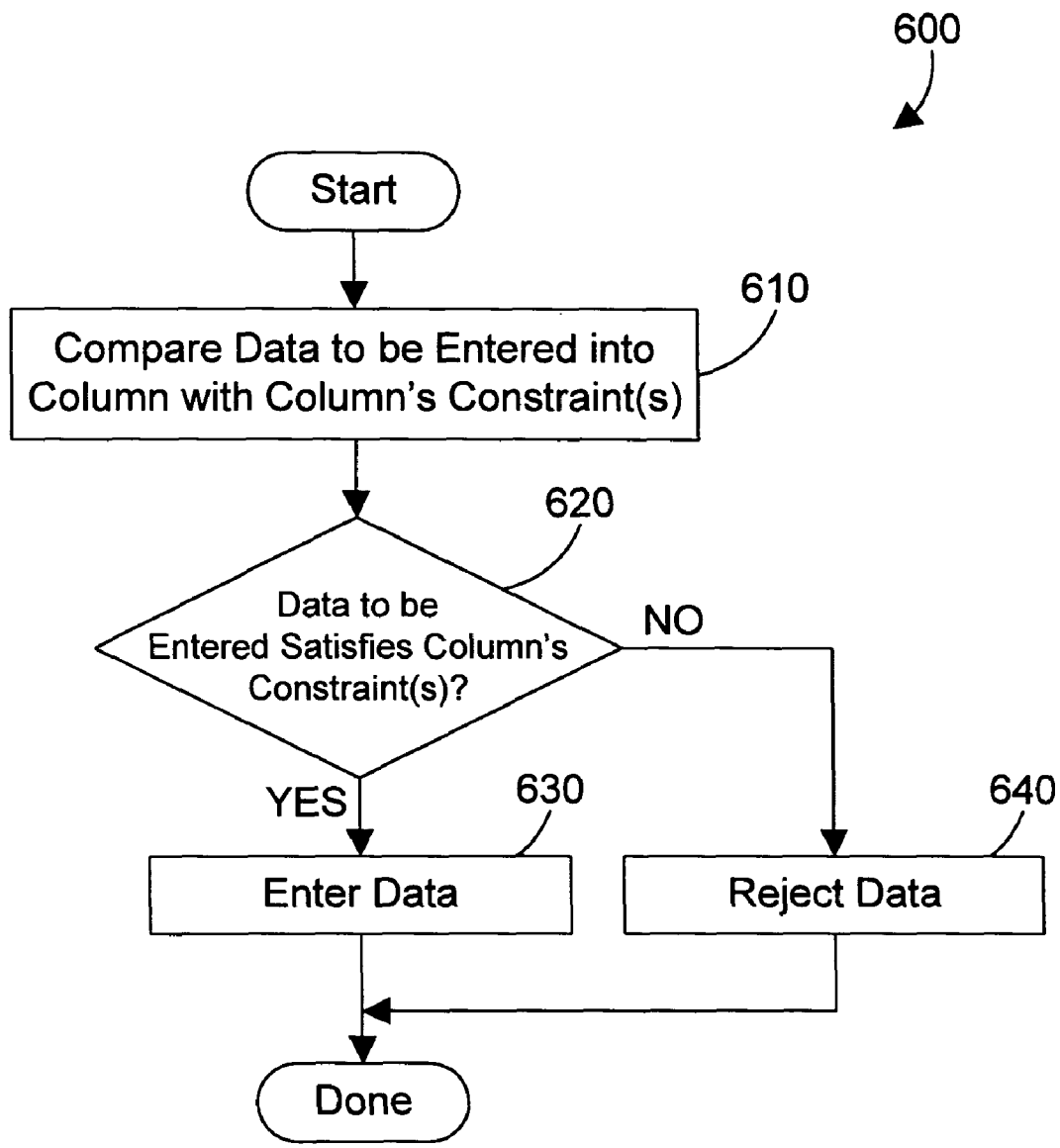
FIG. 6 is a flow diagram of a prior art method for entering data into a column that includes a prior art constraint.

Referring to FIG. 6, a prior art method 600 represents steps performed by a database manager once the prior art constraints in FIGS. 3-5 have been defined. Method 600 begins when data needs to be entered into a column that has one of the constraints in FIGS. 3-5. First, data to be entered into the column is compared with the set of allowed values specified in the column's constraint(s) (step 610). Thus, for the specific example in FIG. 3, step 610 determines whether the data to be entered in the AGE column is between 1 and 99. For the specific example in FIG. 4, step 610 determines whether the data to be entered into the STATE column is in the list of two digit US state codes specified in the constraint. For the specific example in FIG. 5, step 610 determines whether the data to be entered into the MARITAL STATUS column is one of the four allowable letters. If the data to be entered lies within the set of allowable values specified by the column's constraint(s) (step 620=YES), the data is entered into the column (step 630). If the data to be entered in any column is not within the set of allowable values specified by the column's constraint(s) (step 620=NO), the data to be entered is rejected (step 640). In this manner, prior art method 600 limits the values of data that may be written to a database column by restricting data entry to a set of values that satisfy constraints, such as those in FIGS. 3-5.

Note that the set of allowable values for all three prior art constraints in FIGS. 3-5 are static. They are defined when the constraint is created. Nowhere does the prior art teach or suggest a constraint that defines a set of allowable values for a column that is determined by data in a different database column that may be of a different type. The relationship constraint of the preferred embodiments may specify a set of allowable values for one column depending on data in a different column that may be of a different type. The set of allowable values is thus data-driven from data in the database.

Foreign key constraints are also known in the art. A foreign key constraint is defined on a column that is a duplicate of a column in a different database table. The foreign key constraint restricts the set of allowable values of a first column to the values actually entered into a second column in a different database table, where the first and second columns have identical data types. The preferred embodiments provide much broader functionality by allowing a relationship constraint to be defined for a first column that depends on data in a second column, where the data in the second column may be of a different type than data in the first column.

In a first embodiment, a relationship constraint is defined for a selected column with a set of allowable values that depend on data in a different column in the same table. In a second embodiment, a relationship constraint is defined for a selected column with a set of allowable values that depend on data in a different column in a different table that may be of a different type than data in the selected column. In both cases, the database manager analyzes data in a database to dynamically determine a set of allowable values for the relationship constraint.

FIG. 7 shows one example of a relationship constraint within the scope of the first embodiment for the table T shown in FIG. 2. The relationship constraint in FIG. 7 specifies that if the value in the AGE column is less than 15, the set of allowable values in the MARITAL STATUS column is limited to S (single). The reason for this relationship constraint is logical. It is very unusual in our US culture for a person that is less than 15 years old to be married. For this reason, the relationship constraint in FIG. 7 is defined to catch potential errors should the age of a person be less than 15 and the marital status is defined to be something other than single. Note that the relationship constraint in FIG. 7 may be rewritten in column syntax shown in FIG. 8, which shows that the set of allowable values in the MARITAL STATUS column (T.C9) is determined by data in the AGE column of the same table (T.C8). We see from this simple example that the set of allowable values for the MARITAL STATUS column is determined by data in the database (in the AGE column) that is of a different type than data in the MARITAL STATUS column. When a database operator enters record #1 in FIG. 2, the relationship constraint in FIG. 7 will determine that the age column in record #1 contains the value of 26, and will therefore not impose a constraint on Marital Status column. When a database operator enters record #2 in FIG. 2, the relationship constraint in FIG. 7 will determine that the age column in record #2 contains the value of 12, and will therefore impose a constraint that the only allowable value in the marital status column for this record is "S". We see from these two records the dynamic nature of the relationship constraint. The set of allowable values for the Marital Status column record #1 is not constrained, while the set of allowable values for the Marital Status column in record #2 is constrained to a single allowable value. The set of allowable values for a column thus depends on data in a different column that may be of a different data type, thereby allowing sophisticated relationship constraints to be constructed that will help catch when errors in data entry are made.

If a database entry operator attempted to enter record #2 in FIG. 2 into the database with the letter "M" in the Marital Status column, the relationship constraint would detect that the data in the Marital Status column does not lie within the set of allowable values. The action taken then depends on whether the relationship constraint is specified as a warning constraint or as a rejection constraint. If the relationship constraint is specified as a warning constraint, the data is entered, and a suitable warning message is generated. If the relationship constraint is specifies as a rejection constraint, the record would be rejected.

Another relationship constraint within the scope of the first embodiment for the table T shown in FIG. 2 is shown in FIG. 9. This constraint is defined by a CASE statement that specifies a list of two digit state codes and their corresponding allowable ZIP code values. Referring to FIG. 9, for a state code of AZ (Arizona), the ZIP code must be 85* or 86* (where * denotes any numerical digit (or don't care)). For a state code of CA (California), the ZIP code must be between 91* and 96*. For a state code of WY (Wyoming), the ZIP code must be 82*. This same relationship constraint is shown in FIG. 10 in syntax that indicates the column numbers in FIG. 2 instead of the column names. Here again, the relationship constraint shown in FIGS. 9 and 10 defines a set of allowable values for the ZIP column according to data in the STATE column. We also see from this example that the set of allowable values is determined by data in the database. Thus, when a database operator enters record #1 in FIG. 2, the relationship constraint in FIG. 9 will determine that the State column in record #1 contains the two letter code WY, and will therefore impose a constraint on the ZIP column of 82*. When a database operator enters record #2 in FIG. 2, the relationship constraint in FIG. 9 will determine that the State column in record #2 contains the two letter code AZ, and will therefore impose a constraint on the ZIP column of 85* or 86*. We see from these two records the dynamic nature of the relationship constraint. The set of allowable values for the ZIP column in record #1 is constrained to 82*, while the set of allowable values for the ZIP column in record #2 is constrained to 85* or 86***. The set of allowable values for a column thus depends on data in a different column, thereby allowing sophisticated relationship constraints to be constructed that will help catch when errors in data entry are made.

If a database entry operator attempted to enter record #2 in FIG. 2 into the database with a ZIP code of 82050, the relationship constraint would detect that the data in the ZIP column does not lie within the set of allowable values. The action taken then depends on whether the relationship constraint is specified as a warning constraint or as a rejection constraint. If the relationship constraint is specified as a warning constraint, the data is entered, and a suitable warning message is generated. If the relationship constraint is specifies as a rejection constraint, the record would be rejected.

Figure 11:
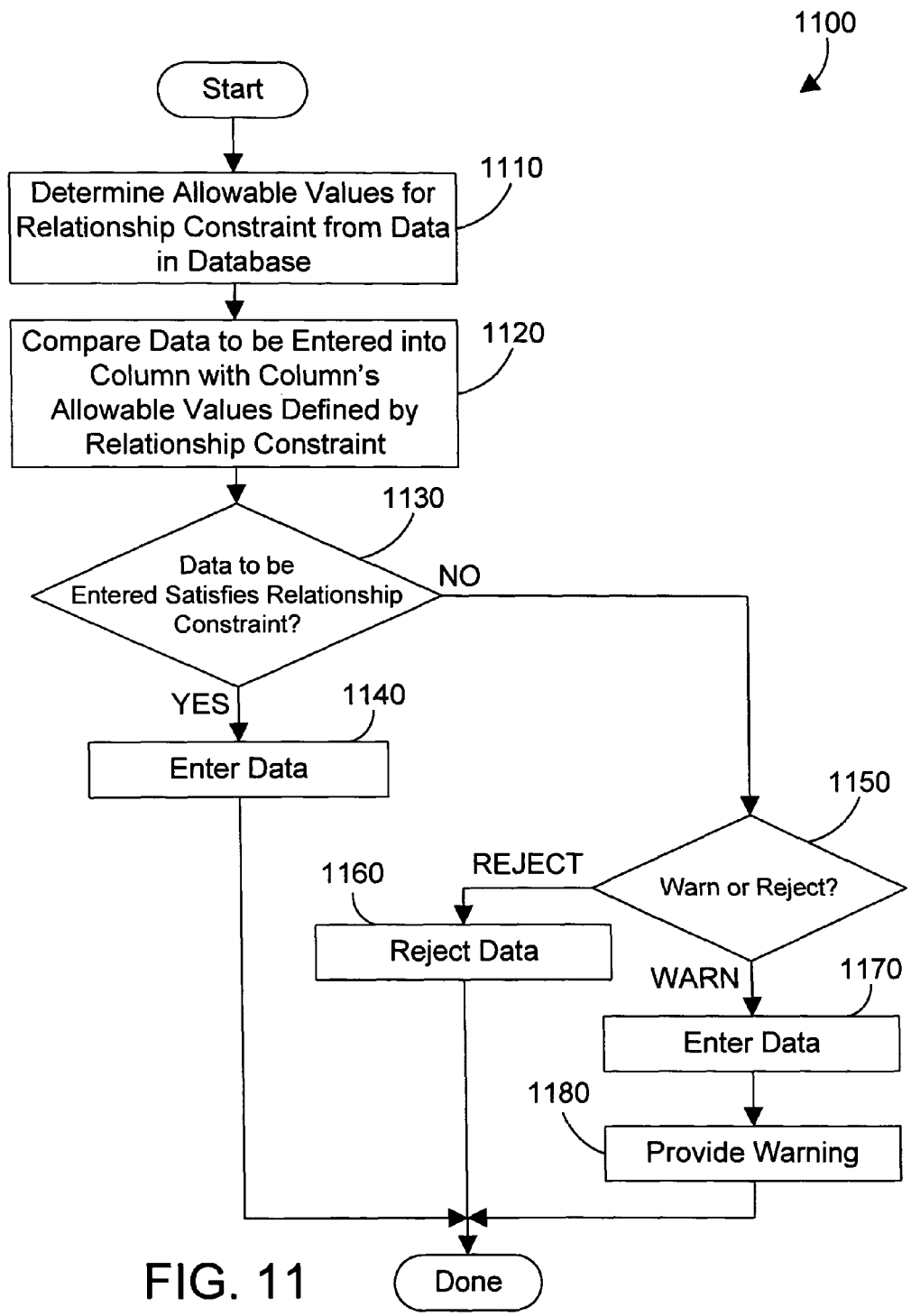
FIG. 11 is a flow diagram of a method in accordance with the preferred embodiments for entering data into a column that includes a relationship constraint of the preferred embodiments.

Referring to FIG. 11, a method 1100 in accordance with the preferred embodiments is performed by a database manager once one or more relationship constraints (such as those shown in FIGS. 7-10) are defined. Method 1100 assumes that data needs to be entered into a column on which a relationship constraint of the present invention is defined. The first step is to determine the allowable values for the relationship constraint from data in a different column of the database (step 1110). Next, the data to be entered into the column is compared with the column's set of allowable values (step 1120). If the data to be entered lies within the set of allowable values defined by the relationship constraint (step 1130=YES), the data is entered (step 1140). If the data to be entered does not lie within the set of allowable values for the relationship constraint (step 1130=NO), the action taken depends on whether the relationship constraint was specified as a warning constraint or a rejection constraint. The present invention includes the concept of defining different types of relationship constraints. If the relationship constraint at issue in FIG. 11 is specified as a warning constraint (step 1150=WARN), the data is entered (step 1170), and a warning is provided (step 1180). The warning may take any suitable form, including a message to a database administrator, a return code to a program that entered the data, an e-mail to an appropriate person, etc. If the relationship constraint at issue in FIG. 11 is specified as a rejection constraint (step 1150=REJECT), the data is rejected (step 1160). The relationship constraints of the preferred embodiments thus give great flexibility in defining a set of allowable values for a column that are determined from data in the database, and that may be specified as either warning constraints or rejection constraints.

Two tables X and Y are shown in FIGS. 12 and 13, respectively, to illustrate the concepts of the second embodiment. The first embodiment allows defining a relationship constraint that determines a set of allowable values from data in a different column in the same database table. The second embodiment extends this concept to columns in different database tables. Referring to FIG. 14, a relationship constraint in accordance with the preferred embodiments defines a set of allowable values for the MARITAL STATUS column in Table Y based on data in the AGE column in Table X. This inter-table relationship is shown clearly in the column syntax in FIG. 15. We see again from this example that the set of allowable values is determined by data in the database. Thus, when a database operator enters record #1 in Table Y in FIG. 13, the relationship constraint in FIG. 14 will determine that the age column in record #1 of Table X in FIG. 12 contains the value of 26, and will therefore not impose a constraint on the Marital Status column. When a database operator enters record #2 in Table Y in FIG. 13, the relationship constraint in FIG. 14 will determine that the age column in record #2 of Table X in FIG. 12 contains the value of 12, and will therefore impose a constraint that the only allowable value in the marital status column for this record is "S". We see from these two records the dynamic nature of the relationship constraint. The set of allowable values for the Marital Status column in record #1 is not constrained, while the set of allowable values for the Marital Status column in record #2 is constrained to a single allowable value. The set of allowable values for a column thus depends on data in a different column, thereby allowing sophisticated relationship constraints to be constructed that will help catch when errors in data entry are made.

If a database entry operator attempted to enter record #2 in Table Y in FIG. 13 with the letter "M" in the Marital Status column, the relationship constraint would detect that the data in the Marital Status column does not lie within the set of allowable values. The action taken then depends on whether the relationship constraint is specified as a warning constraint or as a rejection constraint. If the relationship constraint is specified as a warning constraint, the data is entered, and a suitable warning message is generated. If the relationship constraint is specifies as a rejection constraint, the record would be rejected.

The second embodiment provides a relationship constraint for a first column in a first database table that has a set of allowable values that are defined by data in a second column in a second database table. This concept may be extended to any suitable number of columns in any table. Thus, a relationship constraint in accordance with the preferred embodiments could specify a set of allowable values for one column in a first database table based on two or more columns in one or more other database tables. The preferred embodiments expressly extend to relationship constraints that define a set of allowable values as a function of any suitable number of data values in any suitable number of columns in any suitable number of tables.

The specific examples shown in the figures illustrate some very simple and basic examples of relationship constraints within the scope of the preferred embodiments. Of course, more complex relationship constraints could be defined. The present invention expressly extends to any and all methods for defining a set of allowable values as a function of data in one or more other columns in the same or in a different database table that may be of a different type. The preferred embodiments provide relationship constraints that specify a set of allowable values that depend on data in the database. The set of allowable values for a relationship constraint is thus data-driven.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a first database table residing in the memory;
   a relationship constraint defined for a first column in the first database table, the relationship constraint specifying a set of allowable values for the first column that depends on data in a second column that may be of a different type than data in the first column; and
   a database manager residing in the memory and executed by the at least one processor, the database manager comparing data to be entered into the first column with the set of allowable values specified in the relationship constraint, and if the data to be entered satisfies the relationship constraint, the database manager enters the data in the first column.

2. The apparatus of claim 1 wherein the second column is in the first database table.

3. The apparatus of claim 1 wherein the second column is in a second database table.

4. The apparatus of claim 1 wherein the relationship constraint specifies a set of allowable values that further depends on data in a third column.

5. The apparatus of claim 1 wherein the database manager allows entry of data into the first column of the first database table only when data to be written to the first column lies within the set of allowable values for the first column.

6. The apparatus of claim 1 wherein:
   if data to be written to the first column lies within the set of allowable values for the first column, the database manager allows entry of the data into the first column of the database; and
   if data to be written to the first column lies outside the set of allowable values for the first column, the database manager allows entry of the data into the first column of the database, and in response thereto, provides a warning message.

7. An apparatus comprising:
   at least one processor;
   a memory coupled to the at least one processor;
   a database table residing in the memory;
   a relationship constraint defined for a first column in the database table, the relationship constraint specifying a set of allowable values that depends on data in a second column in the database table; and
   a database manager residing in the memory and executed by the at least one processor, the database manager comparing data to be entered into the first column with the set of allowable values specified in the relationship constraint, and if the data to be entered satisfies the relationship constraint, the database manager enters the data in the first column.

8. The apparatus of claim 7 wherein the database manager allows entry of data into the first column of the database table only when data to be written to the first column lies within the set of allowable values for the first column.

9. The apparatus of claim 7 wherein the database manager allows entry of data into the first column of the database table when data to be written to the first column lies outside the set of allowable values for the first column, and in response thereto, provides a warning message.

10. An apparatus comprising:
    at least one processor;
    a memory coupled to the at least one processor;
    a first database table residing in the memory;
    a relationship constraint defined for a first column in the first database table, the relationship constraint defining a set of allowable values that depends on:
       data in a second column that may be of a different type than data in the first column; and
       data in a third column; and
    a database manager residing in the memory and executed by the at least one processor, the database manager comparing data to be entered into the first column with the set of allowable values defined in the relationship constraint, and if the data to be entered satisfies the relationship constraint, the database manager enters the data in the first column.

11. The apparatus of claim 10 wherein the second column is in the first database table.

12. The apparatus of claim 10 wherein the second column is in a second database table.

13. The apparatus of claim 10 wherein the third column is in the first database table.

14. The apparatus of claim 10 wherein the third column is in a second database table.

15. The apparatus of claim 10 wherein the third column is in a third database table.

16. The apparatus of claim 10 wherein the database manager allows entry of data into the first column of the first database table only when data to be written to the first column lies within the set of allowable values for the first column.

17. The apparatus of claim 10 wherein the database manager allows entry of data into the first column of the first database table when data to be written to the first column lies outside the set of allowable values for the first column, and in response thereto, provides a warning message.

18. A computer-implemented method for managing entry of data into a column in a database table, the method comprising the steps of:
(A) selecting the column;
(B) defining a set of allowable values for the column that depends on data in a second column that may be of a different type than data in the column;
(C) comparing data to be entered into the column with the set of allowable values; and
(D) if the data to be entered lies within the set of allowable values, entering the data in the column.

19. The method of claim 18 wherein the second column is in the first database table.

20. The method of claim 18 wherein the second column is in a second database table.

21. The method of claim 18 wherein the set of allowable values in step (B) further depends on data in a third column.

22. The method of claim 18 further comprising the step of allowing entry of data into the column in the database table only when data to be written to the column lies within the set of allowable values for the column.

23. The method of claim 18 further comprising the steps of:
if data to be written to the column lies within the set of allowable values for the column, allowing entry of the data into the column of the database; and
if data to be written to the column lies outside the set of allowable values for the column, allowing entry of the data into the column of the database, and in response thereto, providing a warning message.

24. A computer-implemented method for managing entry of data into a first column in a database table, the method comprising the steps of:
(A) selecting the first column;
(B) defining a set of allowable values for the first column that depends on data in a second column in the database table;
(C) comparing data to be entered into the first column with the set of allowable values; and
(D) if the data to be entered lies within the set of allowable values, entering the data in the first column.

25. The method of claim 24 further comprising the step of allowing entry of data into the first column of the database table only when data to be written to the first column lies within the set of allowable values for the first column.

26. The method of claim 24 further comprising the step of allowing entry of data into the first column of the database table when data to be written to the first column lies outside the set of allowable values for the first column, and in response thereto, providing a warning message.

27. A computer-implemented method for managing entry of data into a first column in a first database table, the method comprising the steps of:
(A) selecting the first column;
(B) defining a set of allowable values for the first column that depends on:
data in a second column that may be of a different type than data in the first column; and
data in a third column;
(C) comparing data to be entered into the first column with the set of allowable values; and
(D) if the data to be entered lies within the set of allowable values, entering the data in the first column.

28. The method of claim 27 wherein the second column is in the first database table.

29. The method of claim 27 wherein the second column is in a second database table.

30. The method of claim 27 wherein the third column is in the first database table.

31. The method of claim 27 wherein the third column is in a second database table.

32. The method of claim 27 wherein the third column is in a third database table.

33. The method of claim 27 further comprising the step of allowing entry of data into the first column of the first database table only when data to be written to the first column lies within the set of allowable values for the first column.

34. The method of claim 27 further comprising the step of allowing entry of data into the first column when data to be written to the first column lies outside the set of allowable values for the first column, and in response thereto, providing a warning message.

35. A computer-readable program product comprising software residing on non-transitory recordable media, the software comprising:
a database manager that allows defining a relationship constraint for a first column in a first database table, the relationship constraint specifying a set of allowable values for the first column that depends on data in a second column that may be of a different type than data in the first column, the database manager comparing data to be entered into the first column with the set of allowable values specified in the relationship constraint, and if the data to be entered satisfies the relationship constraint, the database manager enters the data in the first column.

36. The program product of claim 35 wherein the second column is in the first database table.

37. The program product of claim 35 wherein the second column is in a second database table.

38. The program product of claim 35 wherein the relationship constraint specifies a set of allowable values that further depends on data in a third column.

39. The program product of claim 35 wherein the database manager allows entry of data into the first database table only when data to be written to the first column lies within the set of allowable values for the first column.

40. The program product of claim 35 wherein:
if data to be written to the first column lies within the set of allowable values for the first column, the database manager allows entry of the data into the first column of the database; and
if data to be written to the first column lies outside the set of allowable values for the first column, the database manager allows entry of the data into the first column of the database and, in response thereto, provides a warning message.

41. A computer-readable program product comprising software residing on non-transitory recordable media, the software comprising:
a database manager that allows defining a relationship constraint for a first column in a database table, the relationship constraint specifying a set of allowable values that depends on data in a second column in the database table, the database manager comparing data to be entered into the first column with the set of allowable values specified in the relationship constraint, and if the data to be entered satisfies the relationship constraint, the database manager enters the data in the first column.

42. The program product of claim 41 wherein the database manager allows entry of data into the first column of the database table only when data to be written to the first column lies within the set of allowable values for the first column.

43. The program product of claim 41 wherein the database manager allows entry of data into the first column of the database table when data to be written to the first column lies outside the set of allowable values for the first column, and in response thereto, the database manager provides a warning message.

44. A computer-readable program product comprising software residing on non-transitory recordable media, the software comprising:
  a database manager that allows defining a relationship constraint for a first column in a first database table, the relationship constraint defining a set of allowable values that depends on:
    data in a second column that may be of a different type than data in the first column; and
    data in a third column;
  the database manager comparing data to be entered into the first column with the set of allowable values defined in the relationship constraint, and if the data to be entered satisfies the relationship constraint, the database manager enters the data in the first column.

45. The program product of claim 44 wherein the second column is in the first database table.

46. The program product of claim 44 wherein the second column is in a second database table.

47. The program product of claim 44 wherein the third column is in the first database table.

48. The program product of claim 44 wherein the third column is in a second database table.

49. The program product of claim 44 wherein the third column is in a third database table.

50. The program product of claim 44 wherein the database manager allows entry of data into the first column of the first database table only when data to be written to the first column lies within the set of allowable values for the first column.

51. The program product of claim 44 wherein the database manager allows entry of data into the first column of the first database table when data to be written to the first column lies outside the set of allowable values for the first column, and in response thereto, providing a warning message.

\* \* \* \* \*